Oct. 21, 1941.  T. J. ZELLER  2,259,599
POWER OPERATED CLUTCH MECHANISM
Filed Oct. 28, 1939
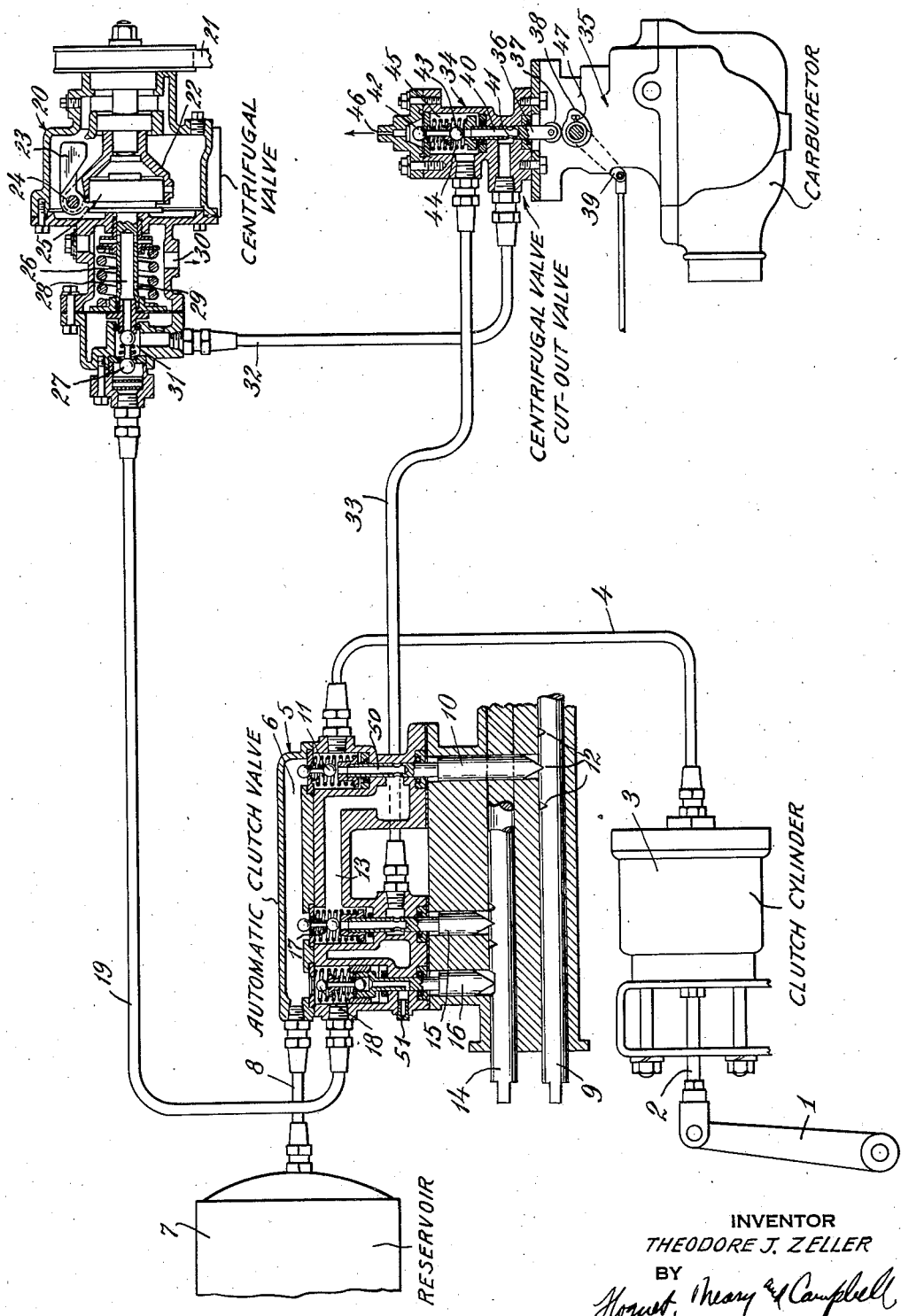
INVENTOR
THEODORE J. ZELLER
BY
ATTORNEYS Patented Oct. 21, 1941

2,259,599

UNITED STATES PATENT OFFICE 2,259,599

POWER OPERATED CLUTCH MECHANISM

Theodore J. Zeller, Plainfield, N. J., assignor to Mack Manufacturing Corporation, Long Island City, N. Y., a corporation of Delaware Application October 28, 1939, Serial No. 301,746

15 Claims. (Cl. 192—.01)

The present invention relates to automatic clutch control systems and embodies, more particularly, an improved automatic clutch control system in which full clutch engagement is insured under all conditions of operation where full clutch engagement is important.

Automatic clutch control systems have heretofore been provided in which the clutch lever is actuated by a clutch cylinder receiving a fluid (e. g. air) under pressure. The supply of the fluid from a reservoir is controlled by a centrifugal valve that is driven by the engine so that, as the engine speeds up, the fluid pressure in the clutch cylinder is relieved, thus permitting more complete clutch engagement. Conversely, as the engine speed approaches its idling speed, the fluid pressure in the clutch cylinder increases, thus releasing the engaging faces of the clutch.

These prior systems have also included an automatic clutch valve that is controlled by the gear shift mechanism so that, as a change of gear is being made, the clutch is released immediately prior to the shift and again engaged upon completion of the shift. This automatic valve also may be formed to prevent undesirable slippage when the vehicle is started in second or third speeds, and also prevents disengagement of the clutch by the centrifugal valve should the engine speed decrease while the vehicle is in second or third gear, thus eliminating any possibility of accidental free wheeling in second or third gear, and enables the engine to be used for braking when going down hill.

Although these prior systems function effectively under normal conditions, it has been found that under conditions of high traction resistance, complete clutch engagement would not be permitted. For example, in engaging a steep hill under full load, the vehicle and engine speed would be such that the centrifugal valve would begin to release the clutch even though maximum torque is essential. This partial clutch engagement would transmit enough torque at the speed range of 600 to 800 revolutions per minute to prevent the engine from increasing in speed to that required by the centrifugal valve for full clutch engagement. However, this torque is not enough to overcome the high traction resistance above referred to and the mechanism, therefore, would fail to function under these conditions.

An object of the present invention, accordingly, is to provide an automatic power operated clutch mechanism wherein means is provided to insure full clutch engagement under all conditions wherein such complete engagement is required.

A further object of the invention is to provide a mechanism of the above character wherein means is provided to effect full clutch engagement under conditions where the vehicle has high traction resistance and the engine speed is reduced but under the necessity of transmitting full torque.

Further objects of the invention will be apparent as it is described in greater detail in connection with the accompanying drawing wherein the single view is a diagrammatic illustration of an automatic power operated clutch mechanism in which the present invention has been embodied.

Referring to the drawing, a clutch lever of known form is shown at 1 and is actuated by a link 2 toward the left to effect disengagement of the clutch. This motion is accomplished by the clutch cylinder 3 also of known design and supplied by a suitable fluid under pressure such as air through a conduit 4. Conduit 4 communicates with an automatic clutch valve 5 which is formed with a manifold 6 receiving air under pressure from a reservoir 7 through a pipe 8.

The automatic clutch valve 5 utilizes the shifter rods of the transmission mechanism to effect disengagement of the clutch immediately prior to the changing of the transmission gears and to reengage the clutch after the speed change has been effected. For example, the first speed and reverse shifter rod 9 actuates a poppet 10 to actuate an intake and exhaust valve assembly 11 which in the raised position admits air under pressure from the manifold 6 to the conduit 4 and clutch cylinder 3 to disengage the clutch. After the speed change has been effected, the poppet drops into a notch 12 in the rod 9 to permit valve assembly 11 to close the air passage from the manifold 6 and to connect the conduit 4 by means of the passage 50 in poppet 10 to a manifold 13. The transmission mechanism is arranged so that the shifter rods will have sufficient free movement to insure actuation of the poppets before any gear movement starts.

The second and third speed shifter rod 14 actuates two poppets 15 and 16. Poppet 15 actuates a valve assembly 17 which in the raised position supplies air under pressure from the manifold 6 through the manifold 13, passage 50, and conduit 4 to the clutch cylinder to disengage the clutch. In the lowered position, valve assembly 17 closes the air passage from the manifold 6 and connects the manifold 13 with conduit 33 which in turn is connected with a centrifugal valve 20, as hereinafter described.

The poppet 16, which is actuated when shifter rod 14 is in second or third speed position, in turn actuates a valve assembly 18 which in the lowered position connects the manifold 6 with a conduit 19 which, in turn, is connected to the centrifugal valve 20. In the raised position which occurs during second and third speeds, valve assembly 18 disconnects manifold 6 from conduit 19 and exhausts conduit 19 to atmosphere through port 51. Port 51 may be restricted to control the speed of engagement into second and third gear.

The centrifugal valve 20 is driven from the engine by a suitable device such as a belt 21 that drives a weight carrier 22 upon which is mounted weights 23 pivoted at 24. The weights actuate a collar 25 connected to a valve stem 26 which actuates an intake and exhaust valve assembly 27. The valve stem 26 is hollow and formed with a passage 28 and port 29 communicating with the atmosphere through a port 30.

At high speeds, a fluid chamber 31 is connected by means of valve stem 26 and port 30 with the atmosphere. Fluid chamber 31 is connected to a conduit 32 which, as hereinafter described, is connected to a conduit 33 that is connected to the clutch cylinder by means of the automatic clutch valve and controlled by poppets 15 and 10 under predetermined conditions. At idling speed, valve assembly 27 closes the passage 28 and connects the fluid chamber 31 to the conduit 19.

It will thus be seen that the centrifugal valve will, according to the speed of the engine in first or reverse gear, either engage or disengage the clutch by admitting air under pressure from conduit 19 through conduit 32 and the automatic clutch valve to the clutch cylinder 3, or by permitting conduit 32 to exhaust to atmosphere. In all other speeds, conduit 19 exhausts to atmosphere through valve assembly 18 and port 51 and, accordingly, the centrifugal valve permits conduit 32 to exhaust to atmosphere regardless of engine speed. The foregoing mechanism is, in itself, old and illustrates the mechanism that has heretofore been used and subject, as above noted, to the disadvantage of preventing full clutch engagement under high traction resistance when the transmission is in first or reverse gear, which would cause the engine speed to approach idling speed.

The present invention provides the hereinafter described mechanism, in combination with the system above described, to insure full clutch engagement under all conditions of operation where it is desired, and to this end, utilizes a device to prevent the centrifugal valve from functioning when the engine throttle is in advanced positions.

In the accompanying drawing, this mechanism is shown by the legend "Centrifugal valve cut-out valve" and indicated by the reference character 34. The casing of valve 34 may be mounted on the carburetor 35 and is provided with a valve stem 36 carrying, at its lower end, a roller cam follower 37. The roller 37 rides on a cam 38 actuated by the throttle control lever 39 so that, in advanced throttle positions, the cam 38 moves the stem 36 upwardly.

The valve stem 36 is formed with an axial passage 40 and a port 41 which communicates with the conduit 32. The valve stem also operates a valve assembly 42, 43 through a spring 44, this valve assembly being received in a chamber 45 that communicates with the conduit 33, and the valve 42 communicates with the atmosphere through a port 46.

In advanced throttle positions, the passage 40 is closed from the conduit 33 by the valve 43 and the valve stem 36 lifts the valve 42 from its seat, permitting the clutch cylinder to exhaust to the atmosphere through the clutch valve, conduit 33, and port 46 of cut-out valve 34. At the same time the passage from the clutch valve and clutch cylinder to the centrifugal valve 20 is closed and control of the clutch cylinder is thus taken away from the centrifugal valve.

The cam 38 is adjustable by means of a set screw 47 so that operation of the cut-out valve may be accomplished at any desired throttle position.

The foregoing mechanism prevents burning of the clutch linings resulting from excessive slippage by insuring clutch engagement at advanced throttle positions with low engine speeds. The engine will either stall or the load will be moved.

A further advantage of the foregoing mechanism is that it permits of checking the clutch condition because the engine can be stalled by advancing the control to the position of full throttle. This is of definite advantage because operators frequently determine the need for adjustment by the time required to stall the engine by engaging the clutch in high gear with the emergency brake applied.

Further advantages will appear and the invention is not to be limited save as defined in the appended claims.

I claim:

1. The combination with a clutch and power operated mechanism to actuate the clutch, including a clutch cylinder adapted to receive a fluid under pressure, and means responsive to engine speed for controlling the pressure of the fluid in said clutch cylinder, of throttle actuating means, and means responsive to movement of said throttle actuating means to render the means responsive to engine speed ineffective to control the fluid pressure in the clutch cylinder when the throttle is advanced a predetermined amount.

2. The combination with a clutch and power operated mechanism to actuate the clutch, including a clutch cylinder adapted to receive a fluid under pressure, and means responsive to engine speed for controlling the pressure of the fluid in said clutch cylinder, of throttle actuating means, and means responsive to movement of said throttle actuating means adapted to establish communication between the clutch cylinder and the atmosphere when the throttle is advanced a predetermined amount, thereby rendering the centrifugal valve ineffective to control the fluid pressure in the clutch cylinder.

3. The combination with a clutch and power operated mechanism to actuate the clutch, including a clutch cylinder adapted to receive a fluid under pressure, and means responsive to engine speed in fluid communication with the clutch cylinder for controlling the pressure of the fluid in the cylinder, of throttle actuating means, and means responsive to movement of said throttle actuating means adapted to interrupt fluid communication between the clutch cylinder and the means responsive to the engine speed, and to establish communication between the clutch cylinder and the atmosphere.

4. The combination with a clutch and power operated mechanism to actuate the clutch, including a clutch cylinder adapted to receive a fluid under pressure, centrifugal engine driven means adapted to control the pressure of fluid in the clutch cylinder, gear change mechanism, and means actuated by the gear change mechanism for rendering the centrifugal engine driven means effective for controlling the pressure of fluid in the clutch cylinder when the gear change mechanism is in at least one operating position, of throttle actuating means, and means operated by said throttle actuating means to render thhe centrifugal engine driven means ineffective to control the fluid pressure in the clutch cylinder when the throttle is advanced a predetermined amount.

5. The combination of a clutch and power operated mechanism to actuate the clutch comprising a reservoir of fluid under pressure, a clutch cylinder adapted to receive a fluid under pressure for disengaging the clutch, a centrifugal engine driven valve in fluid communication with the atmosphere and adapted to communicate with the fluid reservoir and with the clutch cylinder for controlling the fluid pressure in the clutch cylinder in accordance with the speed of the engine, gear change mechanism, a clutch valve actuated by the gear change mechanism for establishing fluid communication of the centrifugal valve with the fluid reservoir and with the clutch cylinder while the gear change mechanism is in at least one operating position, throttle actuating means, and means actuated by said throttle actuating means for interrupting the fluid communication between the centrifugal valve and the clutch cylinder while the throttle actuating means is in at least one operating position.

6. The combination of a clutch and power operated mechanism to actuate the clutch comprising a reservoir of fluid under pressure, a clutch cylinder adapted to receive a fluid under pressure for disengaging the clutch, a centrifugal engine driven valve in fluid communication with the atmosphere and adapted to communicate with the fluid reservoir and with the clutch cylinder for controlling the fluid pressure in the clutch cylinder in accordance with the speed of the engine, gear change mechanism, a clutch valve actuated by the gear change mechanism for establishing fluid communication of the centrifugal valve with the fluid reservoir and with the clutch cylinder while the gear change mechanism is in at least one operating position, throttle actuating means, and means actuated by said throttle actuating means for interrupting the fluid communication between the centrifugal valve and the clutch cylinder and for exhausting the clutch cylinder to atmosphere while the throttle actuating means is in at least one operating position.

7. The combination set forth in claim 6 in which the means for interrupting the fluid communication between the centrifugal valve and the clutch cylinder and for exhausting the clutch cylinder to atmosphere comprises a valve stem operated by the throttle actuating means forming a fluid communication between the centrifugal valve and the clutch cylinder, and a valve operated by the valve stem adapted to close the valve stem and to establish communication between the clutch cylinder and the atmosphere.

8. The combination set forth in claim 6 in which the means for interrupting the fluid communication between the centrifugal valve and the clutch cylinder and for exhausting the clutch cylinder to atmosphere comprises a valve stem forming a fluid communication between the centrifugal valve and the clutch cylinder, means to actuate the valve stem by the throttle actuating means, means to adjust the last named means, and means operated by the valve stem to close the valve stem and to establish communication between the clutch cylinder and the atmosphere.

9. The combination set forth in claim 6 in which the means for interrupting the fluid communication between the centrifugal valve and the clutch cylinder and for exhausting the clutch cylinder to atmosphere comprises a valve assembly having a casing formed with a chamber, said chamber being in fluid communication with the clutch cylinder, a valve stem operated by the throttle actuating means forming a fluid communication between the centrifugal valve and the chamber, a port in the casing open to the atmosphere, and a valve actuated by the valve stem to close the valve stem and to establish communication between the port and the valve chamber.

10. The combination set forth in claim 6 in which the means for interrupting the fluid communication between the centrifugal valve and the clutch cylinder and for exhausting the clutch cylinder to atmosphere comprises a valve assembly having a casing formed with a chamber connected to the clutch valve, a port in the casing open to the atmosphere, a first valve normally closing a communication between the atmosphere and the chamber, a second valve, a passage in the valve stem normally communicating with the chamber, a port in the valve stem connected to the passage and communicating with the centrifugal valve, and means to close the passage in the valve stem by the second valve and open the first valve upon actuation of the valve stem.

11. The combination of a clutch, gear shift mechanism, means responsive to movement of the gear shift mechanism for engaging and disengaging the clutch, means responsive to engine speed for rendering said first named means ineffective to engage the clutch at relatively low engine speed when the gear shift mechanism is in at least one operating position, throttle actuating means, and means responsive to movement of said last named means for rendering the means responsive to engine speed ineffective when the throttle is advanced a predetermined amount.

12. The combination of a clutch, power operated means for actuating the clutch, gear shift mechanism, means responsive to engine speed adapted to energize said clutch actuating means to disengage the clutch at relatively low engine speed, throttle actuating means, means responsive to movement of said last named means for rendering said engine speed responsive means ineffective when the throttle is advanced a predetermined amount, and means responsive to movement of the gear shift mechanism for rendering the engine speed responsive means and the means responsive to movement of the throttle actuating means effective when the gear shift mechanism is in at least one operating position.

13. The combination of a clutch, fluid pressure responsive means for disengaging the clutch, a reservoir of fluid under pressure, gear shift mechanism, valve means responsive to movement of the gear shift mechanism for admitting fluid from said reservoir to said clutch disengaging means during shifting movement of the gear shift mechanism, said valve means being formed to release fluid from the clutch disengaging means when the gear shift mechanism is in an operating position, means responsive to engine speed for rendering said valve means ineffective to release fluid from the clutch disengaging means at relatively low engine speed, throttle actuating means, and means responsive to movement of the throttle actuating means for rendering the engine speed responsive means ineffective when the throttle is advanced a predetermined amount.

14. The combination of a clutch, fluid pressure responsive means for disengaging the clutch, a reservoir of fluid under pressure, means responsive to engine speed in fluid communication with the atmosphere adapted to communicate with the clutch disengaging means and the fluid reservoir for admitting fluid to the clutch disengaging means at relatively low engine speed and for releasing fluid from the clutch disengaging means at higher engine speed, gear shift mechanism, valve means responsive to movement of the gear shift mechanism for admitting fluid from the reservoir to the clutch disengaging means during shifting movement of the mechanism and for releasing fluid from the clutch disengaging means when the mechanism is in at least one operating position, said valve means being formed to establish fluid communication between the engine speed responsive means and the fluid reservoir and clutch disengaging means when the mechanism is in at least one other operating position, throttle actuating means, and means responsive to movement of said last named means for interrupting the fluid communication between the engine speed responsive means and for releasing fluid from the clutch engaging means when the throttle actuating means is in at least one operating position.

15. The combination of a clutch, fluid pressure responsive means for disengaging the clutch, a reservoir of fluid under pressure, a plurality of fluid conduits, valve means responsive to engine speed for establishing fluid communication between the first and second conduits at relatively low engine speed and between the first conduit and the atmosphere at higher engine speed, gear shift mechanism, valve means responsive to movement of the gear shift mechanism for establishing fluid communication between the fluid reservoir and the clutch disengaging means during shifting movement of the gear shift mechanism, and to establish fluid communication between the clutch disengaging means and the first conduit when the gear shift mechanism is in an operating position, said last named valve means being formed to establish fluid communication between the second conduit and the fluid reservoir when the gear shift mechanism is in at least one operating position and between the second conduit and the atmosphere when the gear shift mechanism is in at least one other operating position, throttle actuating means, and valve means responsive to movement of the last named means for closing the first conduit and exhausting the clutch disengaging means when the throttle actuating means is in at least one operating position.

THEODORE J. ZELLER.